United States Patent [19]

Von Holdt

[11] Patent Number: 4,570,897
[45] Date of Patent: Feb. 18, 1986

[54] MOLD FOR CONTAINER WITH RECESS-DEFINING FLANGE

[76] Inventor: John W. Von Holdt, 7430 N. Croname Rd., Niles, Ill. 60648

[21] Appl. No.: 694,153

[22] Filed: Jan. 23, 1985

[51] Int. Cl.⁴ .......................... B29C 1/06; B29C 1/16; B29F 1/00
[52] U.S. Cl. ...................................... 249/144; 249/59; 249/63; 249/162; 425/438; 425/DIG. 5; 425/DIG. 58
[58] Field of Search .................. 249/59, 63, 160, 162, 249/144; 425/438, DIG. 5, DIG. 58

[56] References Cited

U.S. PATENT DOCUMENTS

| | | |
|---|---|---|
| 3,843,088 | 10/1974 | McLoughlin et al. ....... 425/DIG. 5 |
| 4,025,022 | 5/1977 | Theysohn et al. ..................... 249/63 |
| 4,362,291 | 12/1982 | Fuke et al. ...................... 425/438 X |
| 4,383,819 | 5/1983 | Letica ............................. 425/DIG. 5 |
| 4,476,083 | 10/1984 | Von Holdt ................. 425/DIG. 58 |
| 4,502,660 | 3/1985 | Luther et al. ................. 425/DIG. 5 |

Primary Examiner—J. Howard Flint, Jr.
Attorney, Agent, or Firm—Charles F. Pigott, Jr.

[57] ABSTRACT

A container mold comprising a mold cavity portion and a mold core portion with the cavity and core portions being relatively moveable between a closed and an open position. By this invention, means are provided for molding a recess-defining flange in the container.

17 Claims, 11 Drawing Figures

MOLD FOR CONTAINER WITH RECESS-DEFINING FLANGE

BACKGROUND OF THE INVENTION

It is known to mold containers which have side recesses of one sort or another. Generally, such a mold must have a moveable "side action" in order to provide such a molded object. For example, Theysohn U.S. Pat. No. 4,025,022 discloses a mold with side action, specifically wedges and guides.

In accordance with this invention, a unique and new form of side action for a mold is provided, which is particularly advantageous in molding a recess-defining flange in a container, for example, a flange on the lip of a container which is turned over by 180°. Such a molded flange requires a metal piece within the space defined inside of the flange. Such a metal piece then must be somehow removed from the flange before the container can be taken off its mold.

DESCRIPTION OF THE INVENTION

In this invention a container mold is provided comprising a mold cavity portion and a mold core portion. The mold cavity and core portions are relatively moveable between a closed, molding position and an open position for removing the freshly molded container.

In accordance with this invention means are provided for molding a recess-defining flange in the container. The means include a split support and mold member, which is typically a ring surrounding the mold core portion. The support and mold member comprises a plurality of segments and is positioned adjacent the site of the recess-defining flanges molded in the container mold.

An inner mold member is positioned in a first position to participate in molding the recess of the recess-defining flange, and capable of being spaced from the flange in a second position. The inner mold member comprises separate portions, each carried by the segments. These portions are each capable of inward and outward movement relative to the segments and the mold.

Means are provided for moving the segments longitudinally and outwardly as the mold goes from the molding to the open position. As the result of this, the inner mold member may be withdrawn from the recess of the flange by a unique mold movement.

As stated above, the split support and mold member is typically a ring surrounding the mold core portion, while the inner mold member is also of annular shape. In this circumstance, the recess-defining flange produced by the mold of this invention may be an annular flange.

It is also desirable for means, such as a spring, for biasing the inner mold member into its second position to be present. This can provide protection to the mold and prevent its self-destruction upon closing of the mold.

The split support and mold member may be carried on an annular platform member surrounding the mold core portion. Means are provided for moving the platform member in the direction of opening and closing of the mold portions.

The annular platform member may comprise a conventional stripper ring, to serve to strip the newly molded containers from the mold core portion.

Angle pins may be provided to move the segments of the split support and mold member outwardly as they move from the first to the second position for disengagement with the newly-molded container as the mold opens.

Accordingly, as the mold opens, the mold cavity portion separates from the mold core to expose the newly molded container. However, the container is locked into position on the mold core by the inner mold member, at least a portion of which occupies the recess of the recess-defining flange of the container which it helped to produce.

For removal of the inner mold member from the recess, the annular platform member is moved longitudinally in the direction of mold opening to cause the container to disengage from the mold core. At the same time, split support and mold member moves along with this longitudinal motion but the various segments begin to move outwardly as well. The inner mold member, on the other hand, cannot move immediately outwardly because a portion of it is locked within the recess-defining flange. However, since the inner mold member is capable of inward and outward movement relative to the segments of the split support and mold member, as stated above, it is left behind by the relative outward movement of the split support and mold member but participates in longitudinal movement so that it is drawn out of the recess defined by the flange in the container. When the inner mold member has cleared the recess, it can also move outwardly, back into its initial relation with the segments of the split support and mold member, but with both of them in a radial outward position. After removal of the container from the mold, it can reclose, and the split support and mold member, the inner mold member and the platform member move back to their first, molding position.

DESCRIPTION OF SPECIFIC EMBODIMENTS

Figure 1:
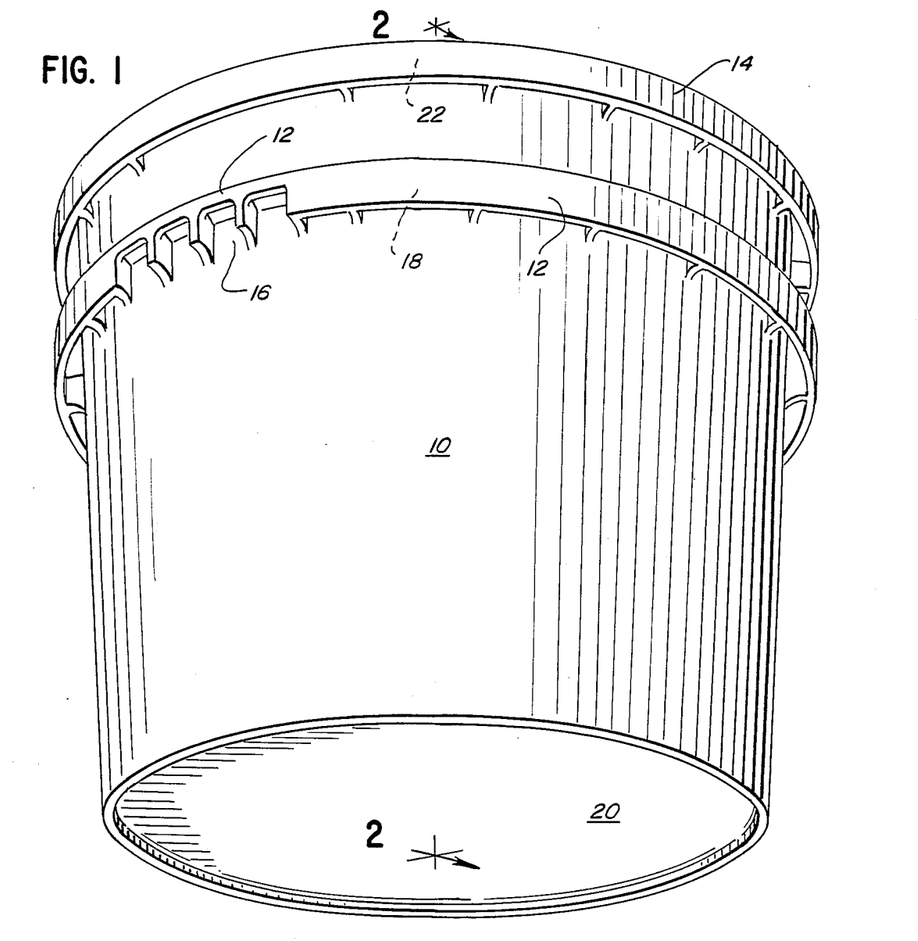
FIG. 1 is a perspective view of a bucket having a recess-defining flange, made in the mold of this invention.
Figure 2:
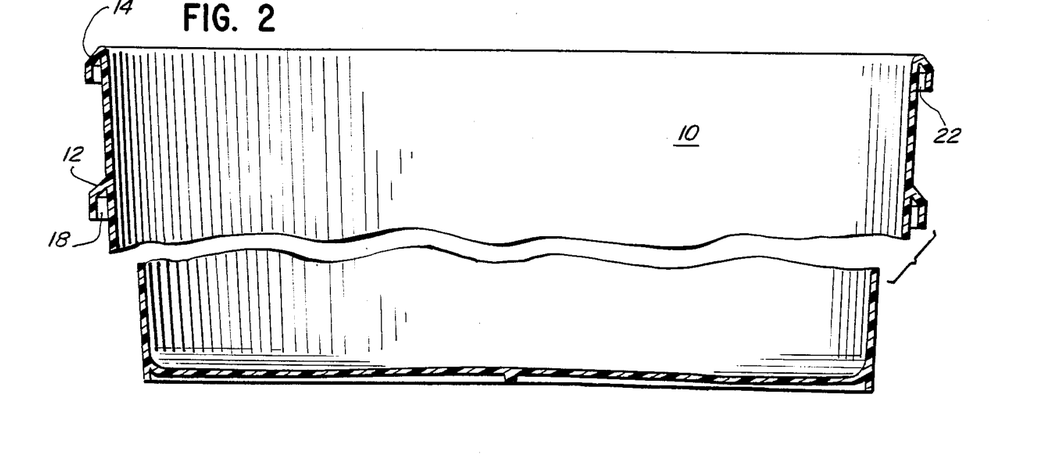
FIG. 2 is a sectional view, with a segment removed, taken along line 2—2 of FIG. 1.
Figure 3:
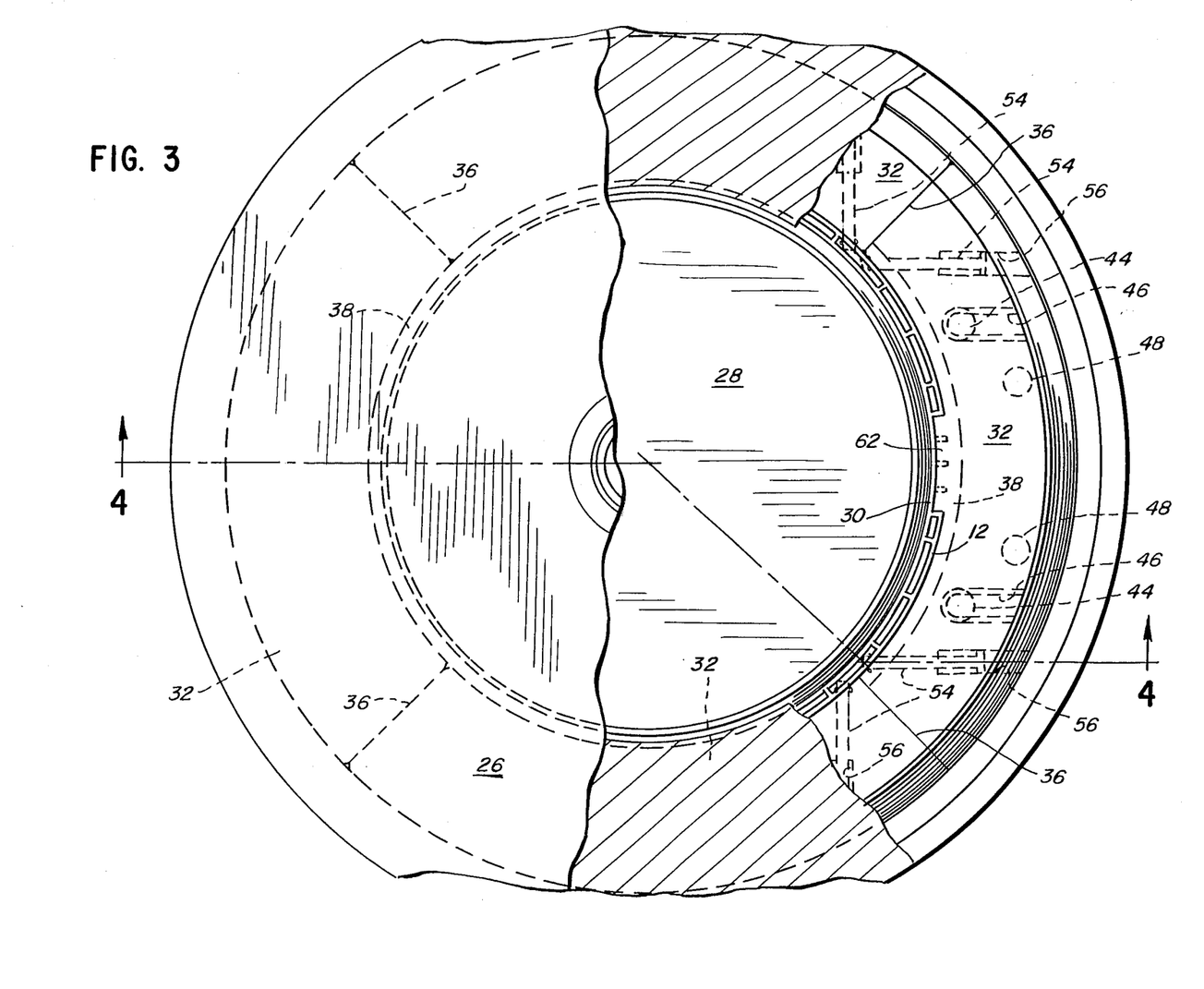
FIG. 3 is a top plan view, with portions broken away, of a mold for making the container of FIGS. 1 and 2.
Figure 4:
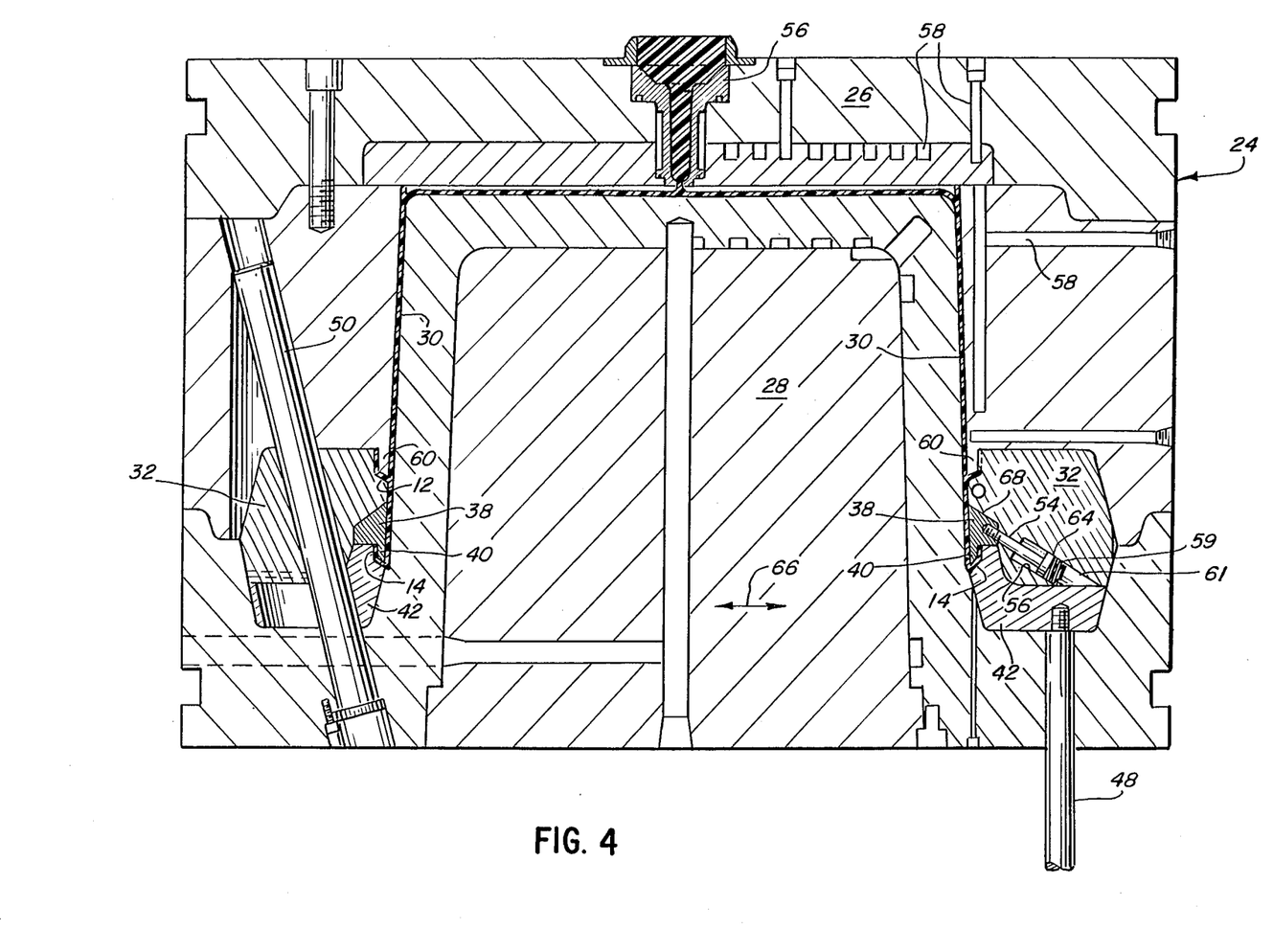
FIG. 4 is a sectional view taken alone line 4—4 of FIG. 3.
Figures 5A, 5B:
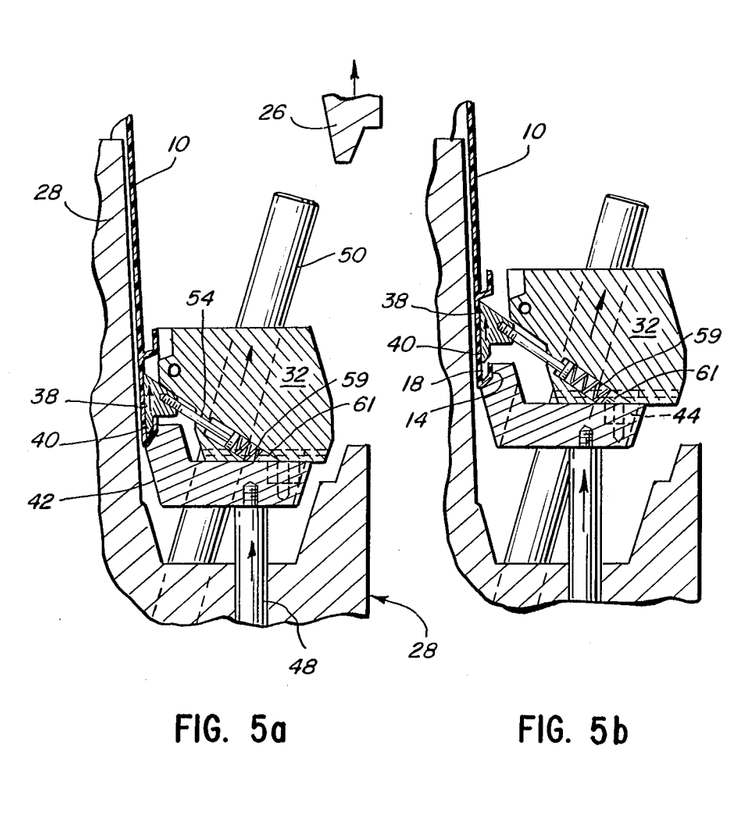
FIGS. 5a through b illustrate various positions that the annular platform member, the split support and mold member, and the inner mold member assume during the opening of the mold.
Figure 5C:
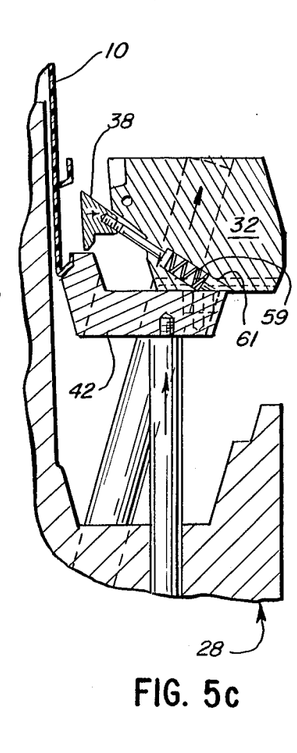
Figure 5D:
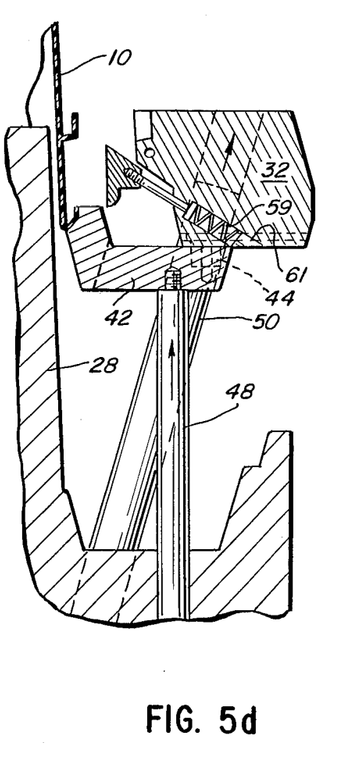
Figure 6:
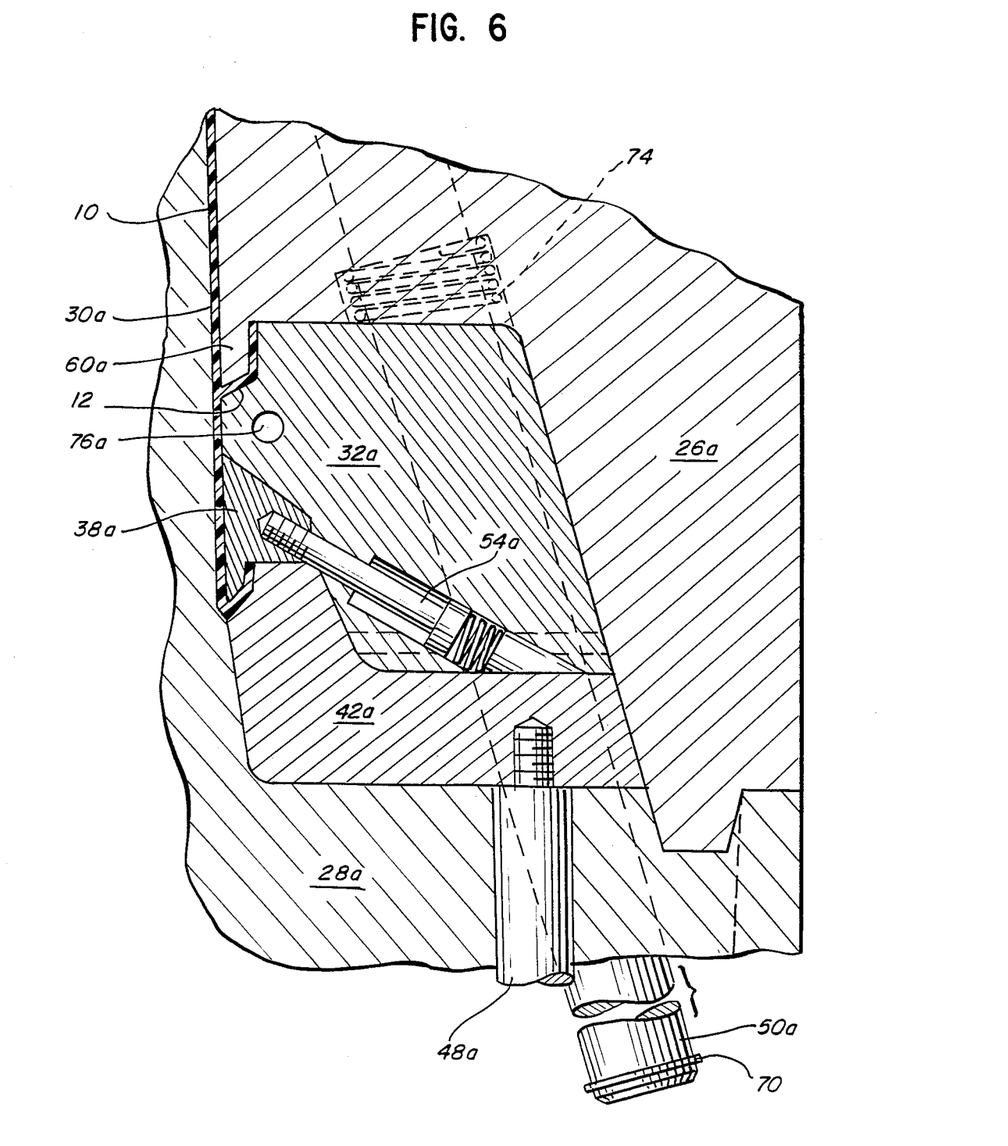
FIG. 6 is a fragmentary, longitudinal sectional view of a modified embodiment of the mold of this invention.

Referring to FIGS. 1 and 2, a bucket 10 is shown, being the specific product manufactured by the mold shown in FIGS. 3-5 and the alternate design mold of FIG. 6. Bucket 10 defines a pair of recess-defining flanges 12, 14 with recess 12 being interrupted by hand hold spaces 16, with a second hand hold space being positioned in diametrically opposite relation on the bucket to the space 16 shown.

As will be apparent, it is not difficult to mold flange 12, since the mold cavity can withdraw from recesses 18 upon opening of the mold in the direction of the bottom 20 of the bucket without difficulty. However, with respect to recesses 22 of annular flange 14, it can be seen that a side action function would be required in the mold to manufacture the bucket, since flange 12 blocks a straight withdrawal of the steel members that form recesses 22.

Referring to FIGS. 3 and 4, the container mold 24 of this invention comprises a mold cavity portion 26 and a mold core portion 28, both of which are of generally conventional design except as otherwise generally indicated herein. Between cavity 26 and core 28 mold chamber 30 is defined in the closed position of the mold, in which bucket 10 may be formed. Cavity 26 and core 28 are hydraulically operable to open and close between the closed molding position as shown in FIG. 4 and an open position for removal of bucket 10.

In accordance with this invention, means are provided for molding recess-defining flange 14 in the container. The means includes a split support and mold member 32 comprising an annular ring in this embodiment which is divided into four separate segments which abut together in close relation along dividing lines 36. Segments 32 may each be of identical design, and are positioned adjacent the site of recess-defining flange 14 which is molded therein.

Inner mold member 38 is also present in the shape of a ring, comprising four separate portions, each of which is attached to a separate segment 32 at a substantially equal circumferential extent as each segment 32. The separate portions of inner mold member 38 each define projections 40 which is, in combination, an annular projection which projects into the mold cavity 30 to define the recess of flange 14.

Annular platform 42 carries the segments of split support and mold member 32, being connected together by a T-nut 44 carried by one of the members, which slides in keyway 46 carried by the other, to permit radial movement of the individual segments of split support and mold member 32 relative to platform member 42.

Push rods 48 are provided, typically two for every segment of split support and mold member 32, to permit platform ring 42 to be elevated and lowered relative to mold core 28. Thus when the mold is opened, platform member 42 may serve as a stripper ring for removal of newly molded bucket 10.

Angle pins 50 are provided in each segment of split support and mold member 32 to force the segments outwardly as platform member 42 is elevated by push rods 48.

The separate portions of inner mold member 38 are carried on a plunger members 54 which terminate in cylinders 56. Thus the portions of inner mold member 38 may be moved inwardly with respect to the position of split support and mold member 32. More accurately, as split support and mold member 32 is moved outwardly by angle pins 50, the portions of inner mold member 38 may be left behind for a brief period.

Apart from this, the functioning of mold 24 is largely conventional, with mold sprue 56 providing molding compound to mold cavity 30 for the molding of individual buckets therein. Appropriate cooling channels 58, only some of which are shown for purposes of general illustration, may be provided as desired.

Mold cavity portion 26 may provide projections 60 which serve to define recesses 18 of flange 12.

Referring to FIGS. 5a–5d, the operation of split support and mold member 32 and related parts is shown. It can be seen how inner mold member 38 can be withdrawn from newly formed recess 18 in a newly formed bucket 10, after the mold has closed and the molding compound has solidified in molding chamber 30.

Mold cavity 26 has been raised upwardly and has withdrawn. In FIG. 5a, push rods 48 are actuating platform 42 upwardly, causing bucket 10 to dislodge from its position on mold core 28. The individual segments of support and mold member 32 are being forced outwardly as the system rises with respect to mold core 28 by the action of angle pins 50, which pass through apertures in the segments of support and mold member 32. At the same time, the separate portions of inner mold member 38 cannot move outwardly, because projections 40 are still caught in recess 18, as shown in FIG. 5a. Thus, while inner mold member 38 is forced upwardly with respect to core 28, it does not move outwardly with split support and mold member 32, but instead plunger 54 moves outwardly in channel 56, permitting member 38 to stay in its radial position in the system while member 32 moves radially outwardly.

In FIG. 5b, projections 40 clear flange 14. At this point, inner mold member 38 is free to move outwardly into its initial relationship with split support and mold member 32. Accordingly, as shown particularly in FIG. 5d, spring 59 in cylindrical chamber 56 causes inner mold member 38 to be biased into its second, extended position. Closing of the mold forces mold member 38 back to its first, molding position. Plug 61 holds spring 59 in position.

As inner mold member 38 moves upwardly with respect to mold core portion 28, bucket 10 is initially prevented from moving with it by the existence of finger portions 62 (FIG. 3) which are present to define finger apertures 16 in molded bucket 10. They are formed on split support and mold member 32 and prevent relative movement of bucket 10 with respect to support and mold member 32 until member 32 has moved radially outwardly by a sufficient distance to clear the bucket altogether. By this time, projection 40 has cleared the recess 18 to a sufficient degree so that bucket 10 will not adhere to projection 40.

The axis of cylindrical chamber 56 is, of course, parallel to its walls 64 which, in turn, form an angle of about 20° to 60° with a line 66 perpendicular to the direction of opening and closing of mold 24.

Preferably the angle of walls 64 and the corresponding axis is about 30°. Then, the upper face 68 of inner mold member 38, i.e., facing the mold core portion defines a plane which assumes an angle to perpendicular line 66 which exceeds the angle of walls 64 by typically about 5° to 10°. Accordingly, when the angle of wall 64 to line 66 is 30° the angle of plane 68 to line 66 may be about 36°.

Accordingly, the double acting side action of this invention provides an improved means by which a recess-defining flange in a container may be formed. As split support and mold member 32 moves upwardly and outwardly, inner mold member retains its inward location, while moving up faster than member 32 as directed by plunger 54, until it is free also to move out. Then, preferably, inner mold member 38 is spring biased to snap outwardly into its original position with respect to member 32 with both of them being positioned radially outwardly to permit removal of bucket 10, sliding outwardly along slots 46 to make this possible. The larger angle of upper face 68 over the angle of walls 64 facilitates the break away of face 68 as members 32 and 38 move relative to each other.

When bucket 10 is removed, the mold may be closed, with push rods 48 retracting to bring platform member 42, split support and mold member 32, and inner mold member 38 back into the original, molding configuration of FIG. 4. Angle pin 50 guides the individual segments of member 32 back to this position.

Figure 6A:
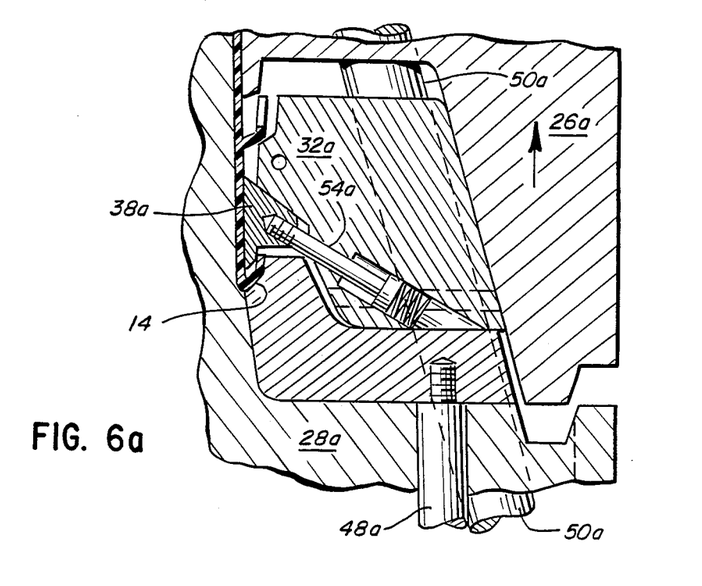
FIGS. 6a and 6b are sectional views showing the structure of FIG. 6 in differing positions.
Figure 6B:
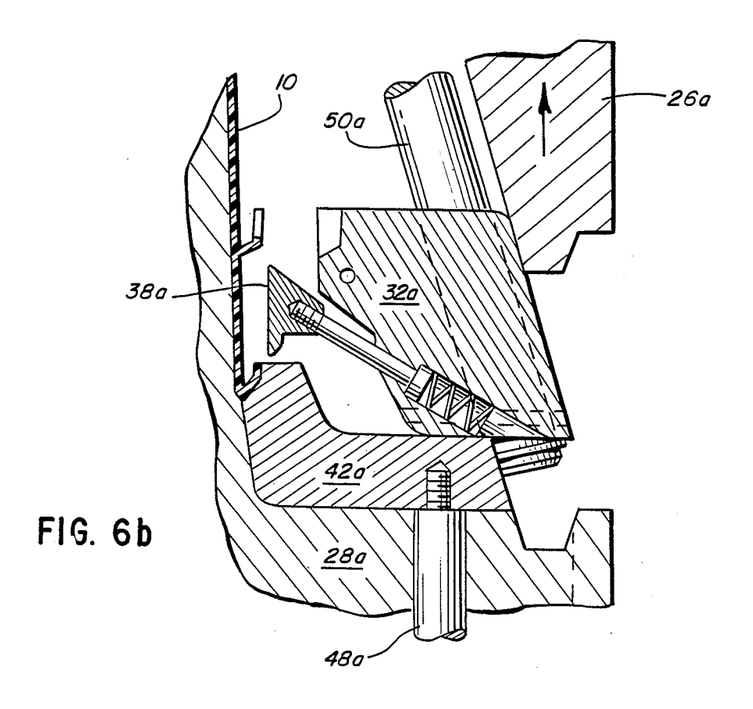

Referring now to FIGS. 6, 6a, and 6b, modifications of the previous embodiment are disclosed. The previous embodiment is unchanged except as indicated herein.

Mold cavity 26a and mold core 28a are as shown, being movable as before to define a mold chamber 30a for molding a bucket 10, identical to the previously molded bucket. Projection 60a is part of mold cavity 26a and forms one side of flange 12 at handle portions 16. Push rods 48a carry platform member 42a which, in turn, carries split support and mold member 32a. Cylindrical apertures 56a, distributed about the mold in the manner of FIG. 3, carry plungers 54a which, in turn, are attached to the separate portions of inner mold member 38a, as in the previous embodiment.

Angle pin 50a differs from the previous embodiment in that it is attached to mold cavity 26a rather than mold core 28a as in the previous embodiment. Snap ring 70 or the like prevents disengagement of split support and mold member 32a from angle pin 50a.

As shown in FIG. 6a, as support and mold member 32a are forced outwardly by angle pin 50a as mold cavity 26a opens, inner mold member 38a is driven upwardly due to the upward angle of motion imparted by plunger 54a until member 38a clears flange 14. Then, as shown in FIG. 6b, member 38a can move sideways with member 32a to clear bucket 10, permitting its removal.

In this instance, mold cavity 26a must move farther away from mold core 28a in opening, since it carries members 32a, 38a and angle pin 50a with it as it opens, to provide adequate room for bucket 10 to be removed. After such separation, platform member 42a may be advanced by push rods 48a to strip bucket 10 out of the mold. It may be noted that in this embodiment, split support and mold member 32a is not mechanically attached to platform member 42a, contrary to the situation in the previous embodiment.

Spring 74 may be used to separate each split support and mold member 32a from mold cavity 26a as the mold opens. Alternatively, hydraulic or pneumatic cylinders may be used to provide the same separating action upon opening of the mold.

The mold of this invention may be used not only on cylindrical buckets but for tapered and rectangular designs of containers, as may be desired.

Cooling lines 76, 76a may be carried respectively by members 32, 32a for carrying water or other fluid for continuous cooling thereof, with the connection to a source of water being made in conventional manner. Inner mold member 38, 38a may also carry water cooling lines for accelerating the molding process.

The mold of this invention provides an effective means for molding a recess-defining flange in a container, the means comprising a side action mechanism that acts in two directions at once. Efficient mold operation may take place for economical production of the desired container.

The above has been offered for illustrative purposes only, and is not intended to limit the scope of the invention of this application, which is as defined in the claims below.

I claim:

1. In a container mold comprising a mold cavity portion and a mold core portion, said mold cavity and mold core portions being relatively movable between a closed, molding position and an open position for removing the freshly molded container, the improvement comprising, in combination:

means for molding a recess-defining flange in said container, said means including;

a split support and mold member comprising a plurality of segments and positioned adjacent the site of said recess-defining flange molded therein; an inner mold member positioned in a first position to participate in molding the recess of said recess-defining flange, and capable of being spaced from said flange in a second position, said inner mold member comprising separate portions each carried by said segments, said inner mold member portions being each capable of inward and outward movement relative to said segments;

and means for moving said segments longitudinally and outwardly as said mold moves from the molding to the open position, whereby said inner mold member is withdrawn from the recess of said flange.

2. The container mold of claim 1 in which said split support and mold member defines a ring surrounding said mold core portion.

3. The container mold of claim 2 in which said recess-defining flange is an annular flange.

4. The container mold of claim 3 in which said inner mold member is of annular shape.

5. The container mold of claim 1 in which means for biasing said inner mold member into its second position are present.

6. The container mold of claim 1 in which said split support and mold member is carried on an annular platform member surrounding said mold core portion, and means are provided for moving the platform member in the direction of opening and closing of the mold portions.

7. The container mold of claim 6 in which said annular platform member serves to strip newly molded containers from the mold core portion.

8. The container mold of claim 1 in which angle pins are provided to move said segments of the split support and mold member outwardly as they move from first to the second position.

9. The container mold of claim 1 in which the direction of inward and outward movement of said inner mold member is at an angle of 20° to 50° from a line perpendicular to the axis of movement between the closed and opened molding positions, said inner mold member defining a surface facing the direction of mold opening, said surface defining a plane which intersects said perpendicular line at an angle which exceeds the first angle, said surface defining a plane being in intimate engagement with a corresponding surface of the split support and mold member in the closed, molding position, whereby breakaway of the split support and mold member and the inner mold member upon moving from the closed, molding position to the open position is facilitated.

10. The container mold of claim 7 in which means are provided to prevent a container molded therein from moving in the direction of mold opening away from the annular platform member until said split support and mold member has moved outwardly a predetermined distance.

11. In a container mold comprising a mold cavity portion and a mold core portion, said mold cavity and mold core portions being relatively moveable between a closed, molding position and an open position for removing the freshly molded container, the improvement comprising, in combination:

means for molding a recess-defining flange in said container, said means including:

a split support and mold ring comprising a plurality of segments and surrounding the site of recess-defining flanges molded therein;

an inner mold ring positioned in a first position to participate in molding the recess of said recess-defining flange, and to be spaced from said flange in a second position, said inner mold member comprising a separate portion, each carried by said segments, said inner mold member portions being each capable of inward and outward movement relative to said segments and said mold;

means for moving said segments longitudinally and outwardly as said mold moves from the molding to the open position, whereby said inner mold member is withdrawn from the recess of said flange; and an annular platform member carrying said split support and mold member and surrounding said mold core portion, plus means for moving said platform member in the direction of opening and closing of the mold portions.

12. The container mold of claim 11 in which means for biasing said inner mold member into its second position are present.

13. The container mold of claim 12 in which said annular platform member serves to strip newly molded containers from the mold core portion.

14. The container mold of claim 13 in which angle pins are provided to move said segments of the split support and mold member outwardly as they move from the first to the second position.

15. The container mold of claim 14 in which the direction of inward and outward movement of said inner mold member is at an angle of 20° to 50° from a line perpendicular to the axis of movement between the closed and opened molding positions, said inner mold member defining a surface facing the direction of mold opening, said surface defining a plane which intersects said perpendicular line at an angle which exceeds the first angle, said surface defining a plane being in intimate engagement with a corresponding surface of the split support and mold member in the closed, molding position, whereby break away of the split support and mold member and the inner mold member upon moving from the closed, molding position to the open position is facilitated.

16. The container mold of claim 15 in which means are provided to prevent container molded therein from moving in the direction of mold opening away from the annular platform member until said split support and mold member has moved outwardly a predetermined distance.

17. The container mold of claim 16 in which the angle pins are attached to the mold core.

* * * * *